VAN DOLAH MORRISON & A. H. SCHLAEGEL.
LOCK FOR STUFFING BOXES.
APPLICATION FILED JULY 7, 1911.
1,003,641.
Patented Sept. 19, 1911.
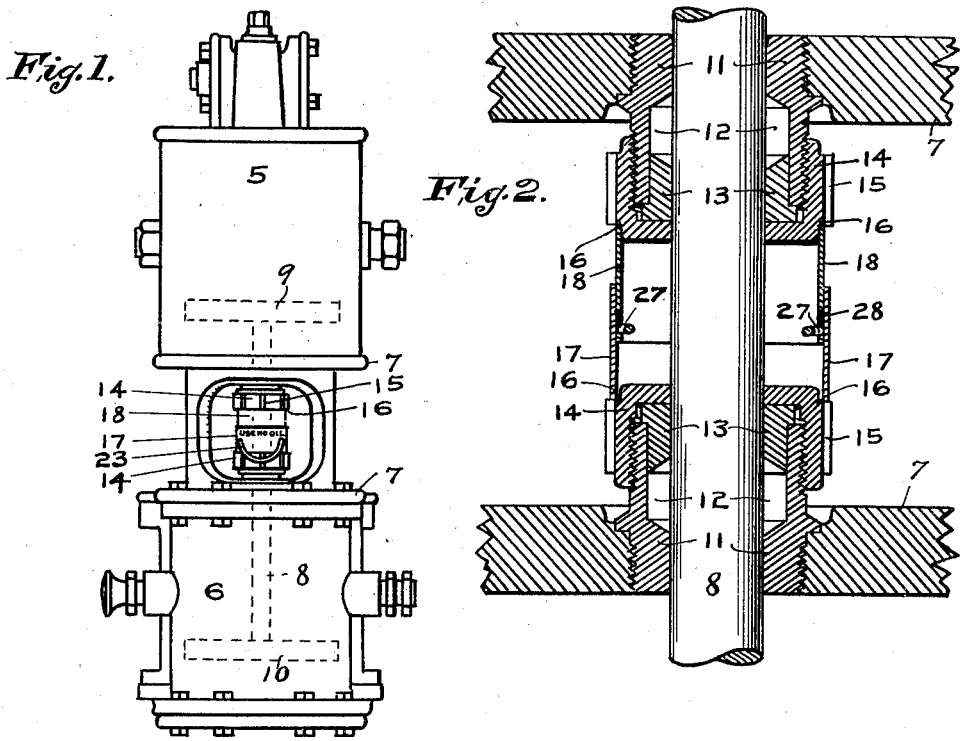
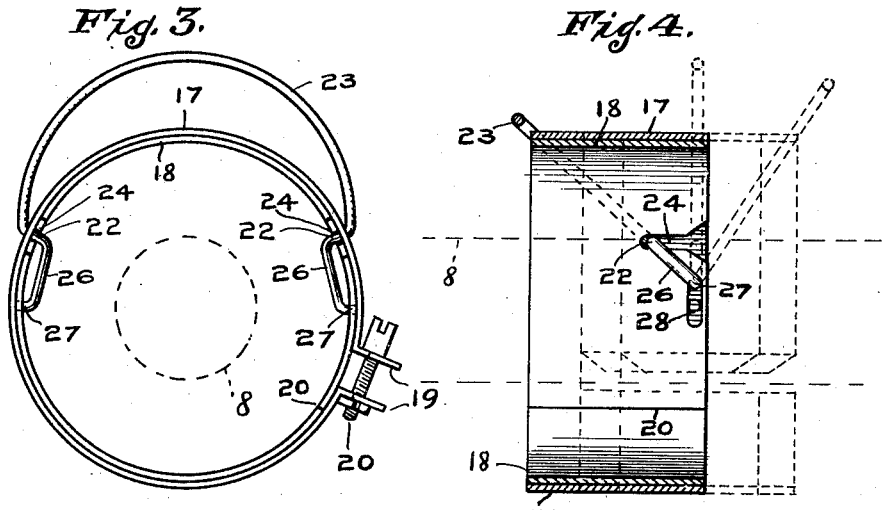
Witnesses;
L. B. Woerner.
W<u>m</u> L. Bushong.
Inventors;
Van D. Morrison and
Albert H. Schlaegel,
By Minturn & Woerner
Attorneys.
COLUMBIA PLANOGRAPH CO., WASHINGTON, D. C.

UNITED STATES PATENT OFFICE.

VAN DOLAH MORRISON AND ALBERT H. SCHLAEGEL, OF INDIANAPOLIS, INDIANA, ASSIGNORS OF ONE-THIRD TO FRANK O. FITTON, OF INDIANAPOLIS, INDIANA.

LOCK FOR STUFFING-BOXES.

1,003,641. Specification of Letters Patent. Patented Sept. 19, 1911.

Application filed July 7, 1911. Serial No. 637,385.

*To all whom it may concern:*

Be it known that we, VAN DOLAH MORRISON and ALBERT H. SCHLAEGEL, citizens of the United States, residing at Indianapolis, in the county of Marion and State of Indiana, have invented certain new and useful Improvements in Locks for Stuffing-Boxes, of which the following is a specification.

This invention relates to air compressors, pumps, and the like having two cylinders in each of which is a reciprocating piston, which pistons are mounted on the same piston rod. A pair of stuffing boxes, one for each cylinder head where the piston rod passes through is required. These screw into the heads of the cylinders and include a follower which is forced and held against a packing by a gland nut which screws on the outer end of the stuffing box.

The object of our invention is to lock the gland nuts on the stuffing boxes, against accidental displacement. We accomplish the above objects by the mechanism illustrated in the accompanying drawing in which—

Figure 1 is a perspective view of a steam-driven air compressor with our invention applied thereto. Fig. 2 is a vertical central section through both stuffing boxes and our invention in operative position thereon. Fig. 3 is an end view of our invention removed from the compressor showing the telescoping sections partly extended, and Fig. 4 is a longitudinal section showing the telescoping parts in retracted or closed position in full lines and in partially open and full open positions in dotted lines.

Like characters of reference indicate like parts throughout the several views of the drawing.

5 is the steam cylinder and 6 the air cylinder of an air compressor having adjacent heads 7.

8 is the piston rod which passes from one cylinder to the other and on which the pistons 9 and 10 (shown in dotted lines in Fig. 1) are rigidly mounted. The stuffing boxes to prevent leakage around the piston rod where it passes through the inner heads of both cylinders 5 and 6 are alike, so that a description of one will suffice for both.

11 is the main body or stuffing box proper, the base of which is externally screw-threaded and which is screwed into a threaded opening in the piston head 7. It has a suitable bore for the passage of rod 8, and an enlargement 12 of the bore to receive a suitable packing material.

13 is a follower which enters the enlarged bore to compress the packing, and 14 is a cap or gland nut which fits over the end of the body 11. It is internally screw-threaded to engage corresponding external threads on the body 11 whereby the gland nut may be screwed down on the follower forcing the latter in to compress the packing. The walls of the gland nuts are thickened and are provided with external grooves 15 for the attachment of a spanner-wrench for turning the gland nuts. The outer end of each gland nut is reduced in diameter forming a shoulder 16 against which an end of one of the telescoping sleeves 17 or 18, of our locking device, has its bearings.

17 is the outer sleeve which is split longitudinally and the ends are bent out to form flanges 19, with suitable holes through which the bolt 20 is passed for the purpose of drawing the flanges together and reducing the diameter of the sleeve. The flanges are normally a considerable distance apart in order to permit of a corresponding variation in the diameter of the sleeve.

18 is the inner sleeve which makes a close sliding fit within sleeve 17. The sleeve 18 is split at 20, near the split in the outer sleeve, and the purpose of the splits in both of the sleeves is to enable them to be opened on those lines sufficiently to allow them to be slipped over the piston rod 8 in the placing and removal of the device. The split 20 is near the one in the outer sleeve in order that they will be close together when opened. A pair of holes is formed through the walls of sleeve 17 on opposite sides of the sleeve, at one side of a diametrical line, to receive the inwardly bent portions 22 of a bail 23. Slots 24 are formed in sleeve 18, opposite the bail holes in sleeve 17, for the free passage of parts 22. The slots 24 extend in from the edges of sleeve 18 and the corners at the ends of the slots are clipped as shown to provide inwardly tapering enlargements at the slot entrances to direct the portions 22 into the slots in telescoping the sleeves. After passing through both sleeves the wire of the bail is bent down and continued to form the straight members 26 and these members are bent out to form the ends 27 which enter openings 28 through the walls of the inner sleeve 18. The bail as above described forms a lever which turns on the parts 22 as fulcrums, the load ends of the levers being in engagement at ends 27 with the inner sleeve so that by swinging the outer bail in the manner illustrated in Fig. 4, the inner sleeve 18 will be telescoped in or out of the outer sleeve 17. To permit this movement of the bail the openings 28 must be elongated as shown in Fig. 4.

When this device is used with stuffing boxes having a lubricant which requires no oil, the outer sleeve provides a place well adapted for the display of directions to "Use no oil."

The operation of our device is as follows: Both sleeves being closed and it being desired to place them around the piston rod, the bolt 20 is unscrewed and removed and the two sleeves are then spread apart and slipped sidewise over the rod 8, the bail being in the position shown in full lines in Fig. 4. The bolt 20 is replaced and the flanges of the outer sleeve are drawn together but not tight enough to lock the inner sleeve. The outer sleeve is placed against the shoulder 16 on the gland nut of the lower stuffing box and the bail is moved down forcing the inner sleeve up, until the latter bears firmly against the shoulder 16 of the gland nut of the upper stuffing box. The sleeves 17 and 18 are then locked together against farther telescoping movement by drawing the flanges 19 together by means of bolt 20, until the inner sleeve is so tightly clamped in the outer one that they are both immovable.

Having thus fully described our invention, what we claim as new and wish to secure by Letters Patent of the United States, is—

1. The combination with a pair of spaced-apart stuffing boxes, of a pair of telescoping members between said stuffing boxes, and means for telescopically moving said members into contact with both boxes.

2. The combination with a pair of spaced-apart stuffing boxes, of a pair of telescoping members between said stuffing boxes, means for telescopically moving said members into contact with both boxes, and means for locking them in that position.

3. The combination with a pair of spaced-apart stuffing boxes, of a pair of sleeves between said boxes, one of said sleeves being telescopically mounted within the other whereby the ends of said sleeves may be moved in opposite directions into contact with their respective adjacent stuffing boxes, and means for telescoping the sleeves.

4. The combination with a pair of spaced-apart stuffing boxes, of a pair of sleeves between said boxes, one of said sleeves being telescopically mounted within the other whereby the ends of said sleeves may be moved in opposite directions into contact with their respective adjacent stuffing boxes, means for telescoping the sleeves, and means for locking them at any given position.

5. The combination of a piston rod, a pair of spaced-apart stuffing boxes through which the rod passes, a pair of sleeves between said stuffing boxes, one of said sleeves being telescopically mounted within the other whereby the ends of said sleeves may be moved in opposite directions into contact with their respective adjacent stuffing boxes, said sleeves being split for lateral placement and displacement with said piston rod, and means for telescoping said sleeves.

6. The combination of a piston rod, a pair of spaced-apart stuffing boxes through which the rod passes, a pair of sleeves between said stuffing boxes, one of said sleeves being telescopically mounted within the other whereby the ends of said sleeves may be moved in opposite directions into contact with their respective adjacent stuffing boxes, said sleeves being split for lateral placement and displacement with said piston rod, means for telescoping said sleeves, and means for impinging the outer split sleeve upon the inner one to lock the sleeves.

7. The combination with a pair of spaced-apart stuffing boxes, of a pair of telescoping sleeves between said stuffing boxes, and a bail having its ends passed through holes in the outer sleeve and through slots in the inner sleeve and prolonged a suitable distance within the inner sleeve and then engaged with the inner sleeve to form a leverage for telescoping the two sleeves and moving them in or out of contact with both of said stuffing boxes.

8. The combination with a pair of spaced-apart stuffing boxes, of a pair of split telescoping sleeves between said stuffing boxes, a bail having its ends passed through holes in the outer sleeve and through slots in the inner sleeve and prolonged a suitable distance within the inner sleeve and then engaged with the inner sleeve to form a leverage for telescoping the two sleeves and moving them in or out of contact with both of said stuffing boxes, and means for closing the outer split sleeve against the inner one to lock the two sleeves together.

In witness whereof, we have hereunto set our hands and seals at Indianapolis, Indiana, this 29th day of June, A. D. one thousand nine hundred and eleven.

VAN DOLAH MORRISON. [L. S.]
    ALBERT H. SCHLAEGEL. [L. S.]

Witnesses:
    F. W. WOERNER,
    J. A. MINTURN.

---

Copies of this patent may be obtained for five cents each, by addressing the "Commissioner of Patents, Washington, D. C."